(12) United States Patent  (10) Patent No.: US 9,124,090 B2
Cortes Rico  (45) Date of Patent: Sep. 1, 2015

(54) COMBINED CIRCUIT BREAKER AND DC POWER SUPPLY APPARATUS, SYSTEMS, AND METHODS

(71) Applicant: Gustavo Cortes Rico, Suwanee, GA (US)

(72) Inventor: Gustavo Cortes Rico, Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 205 days.

(21) Appl. No.: 14/013,232

(22) Filed: Aug. 29, 2013

(65) Prior Publication Data

US 2015/0062769 A1  Mar. 5, 2015

(51) Int. Cl.
*H01H 73/00* (2006.01)
*H02H 3/08* (2006.01)
*H02H 9/02* (2006.01)

(52) U.S. Cl.
CPC ...................................... *H02H 3/08* (2013.01)

(58) Field of Classification Search
CPC ................................ H01H 9/0271; H02J 5/00
USPC .................................... 361/93.1, 115; 307/26
See application file for complete search history.

(56) References Cited

U.S. PATENT DOCUMENTS

| 2,025,233 | A | * | 12/1935 | Durbin | 307/26 |
| 4,326,245 | A |   | 4/1982 | Saleh | |
| 4,901,219 | A |   | 2/1990 | Erickson | |
| 5,627,717 | A | * | 5/1997 | Pein et al. | 361/95 |
| 5,705,862 | A | * | 1/1998 | Lutz et al. | 307/147 |
| 5,712,779 | A | * | 1/1998 | Sheppard et al. | 363/69 |
| 8,134,428 | B2 |  | 3/2012 | Miller | |
| 8,253,271 | B2 | * | 8/2012 | Pan | 307/26 |
| 2002/0105770 | A1 | * | 8/2002 | Seese et al. | 361/115 |
| 2004/0218330 | A1 | * | 11/2004 | Natili et al. | 361/115 |
| 2011/0102958 | A1 | * | 5/2011 | Meehleder | 361/93.1 |
| 2013/0175864 | A1 | * | 7/2013 | Pan et al. | 307/26 |
| 2014/0183954 | A1 | * | 7/2014 | Yoshida et al. | 307/59 |
| 2014/0211345 | A1 | * | 7/2014 | Thompson et al. | 361/42 |
| 2015/0015999 | A1 | * | 1/2015 | Relyea et al. | 361/42 |
| 2015/0069837 | A1 | * | 3/2015 | Covaro et al. | 307/26 |

* cited by examiner

*Primary Examiner* — Stephen W Jackson
*Assistant Examiner* — Christopher Clark

(57) ABSTRACT

A circuit breaker is configured to provide both AC and DC protected power. The circuit breaker is packaged in a housing that includes a tripping module, a DC power supply, an AC load terminal, and a DC load terminal. The tripping module senses and responds to electrical faults by interrupting power, and the DC power supply converts received AC power to DC power. In some embodiments, the circuit breaker may be configured as a main breaker of a circuit breaker panel, while in other embodiments the circuit breaker may be configured as a branch circuit breaker that occupies a single branch circuit breaker mounting location in a circuit breaker panel. Methods of assembling a circuit breaker are also provided, as are other aspects.

19 Claims, 9 Drawing Sheets

COMBINED CIRCUIT BREAKER AND DC POWER SUPPLY APPARATUS, SYSTEMS, AND METHODS

FIELD

The invention relates generally to circuit breakers for interrupting power from an electrical power supply, and more particularly to circuit breakers that provide AC and DC power and/or only DC power.

BACKGROUND

Conventional circuit breaker panels (also known as load centers) typically distribute AC (alternating current) electrical power to a number of branch circuits. The AC electrical power may be supplied by, e.g., a power utility company. Each branch circuit may be connected to one or more loads. For example, in a residence, each branch circuit may have a number of electrical outlets to which one or more electrical devices or appliances may be connected. A conventional circuit breaker is typically mounted in the circuit breaker panel between a main line carrying the AC electrical power and a branch circuit. The circuit breaker may "trip" (i.e., interrupt power to the branch circuit) to prevent electrical shock hazards and/or equipment damage when, e.g., a short circuit, overload, or other hazardous electrical condition is sensed by the breaker.

Although AC power is provided by the branch circuits, more and more devices and systems, such as, e.g., alarm systems, closed-circuit television systems, cell phones, laptop computers, and numerous other handheld and/or portable electronic devices, require DC (direct current) power to operate and/or to recharge batteries used in those devices and/or systems. DC-powered devices and systems typically include an AC/DC adapter that converts the AC power provided by a branch circuit to an appropriate DC voltage. As the types, numbers, and/or use of these DC-powered devices and systems continues to increase, so too may the costs of providing an AC/DC adapter for each system and device and the resulting clutter around electrical outlets caused by the increasing number and use of AC/DC adapters.

A need therefore exists to provide both AC and DC protected power from a circuit breaker panel.

SUMMARY

According to one aspect, a circuit breaker is provided. The circuit breaker includes an AC line connector, an AC load connector, a tripping module coupled between the AC line connector and the AC load connector, the tripping module configured to interrupt power between the AC line connector and the AC load connector in response to sensing an electrical condition between the AC line connector and the AC load connector, a DC power supply circuit having an input and an output, the input coupled between the tripping module and the AC load connector, and the output configured to provide a DC voltage, a DC load connector coupled to the output of the DC power supply circuit; and a housing containing the AC line connector, the AC load connector, the tripping module, the DC power supply circuit, and the DC load connector.

According to another aspect, a circuit breaker panel system is provided. The circuit breaker panel system includes a circuit breaker panelboard that includes a plurality of circuit breaker mounting locations, and a circuit breaker configured to provide AC power and DC power, the circuit breaker including a tripping module and a DC power supply circuit, the tripping module configured to sense and respond to an electrical condition, and the circuit breaker configured to occupy a single one of the plurality of circuit breaker mounting locations.

According to yet another aspect, a method of assembling a circuit breaker is provided. The method includes coupling a tripping module between an AC line connector and an AC load connector, the tripping module configured to sense and respond to an electrical condition between the AC line connector and the AC load connector, coupling an input of a DC power supply circuit between the tripping module and the AC load connector, coupling an output of the DC power supply circuit to a DC load connector, and retaining the tripping module, the DC power supply circuit, the AC line connector, the AC load connector, and the DC load connector in a housing.

Still other aspects, features, and advantages of the invention may be readily apparent from the following detailed description wherein a number of example embodiments and implementations are described and illustrated, including the best mode contemplated for carrying out the invention. The invention may also be capable of other and different embodiments, and its several details may be modified in various respects, all without departing from the scope of the invention. Accordingly, the drawings and descriptions are to be regarded as illustrative in nature, and not as restrictive. The invention covers all modifications, equivalents, and alternatives falling within the scope of the invention.

BRIEF DESCRIPTION OF DRAWINGS

The drawings, described below, are for illustrative purposes only and are not necessarily drawn to scale. The drawings are not intended to limit the scope of the invention in any way.

DETAILED DESCRIPTION

Figure 1:
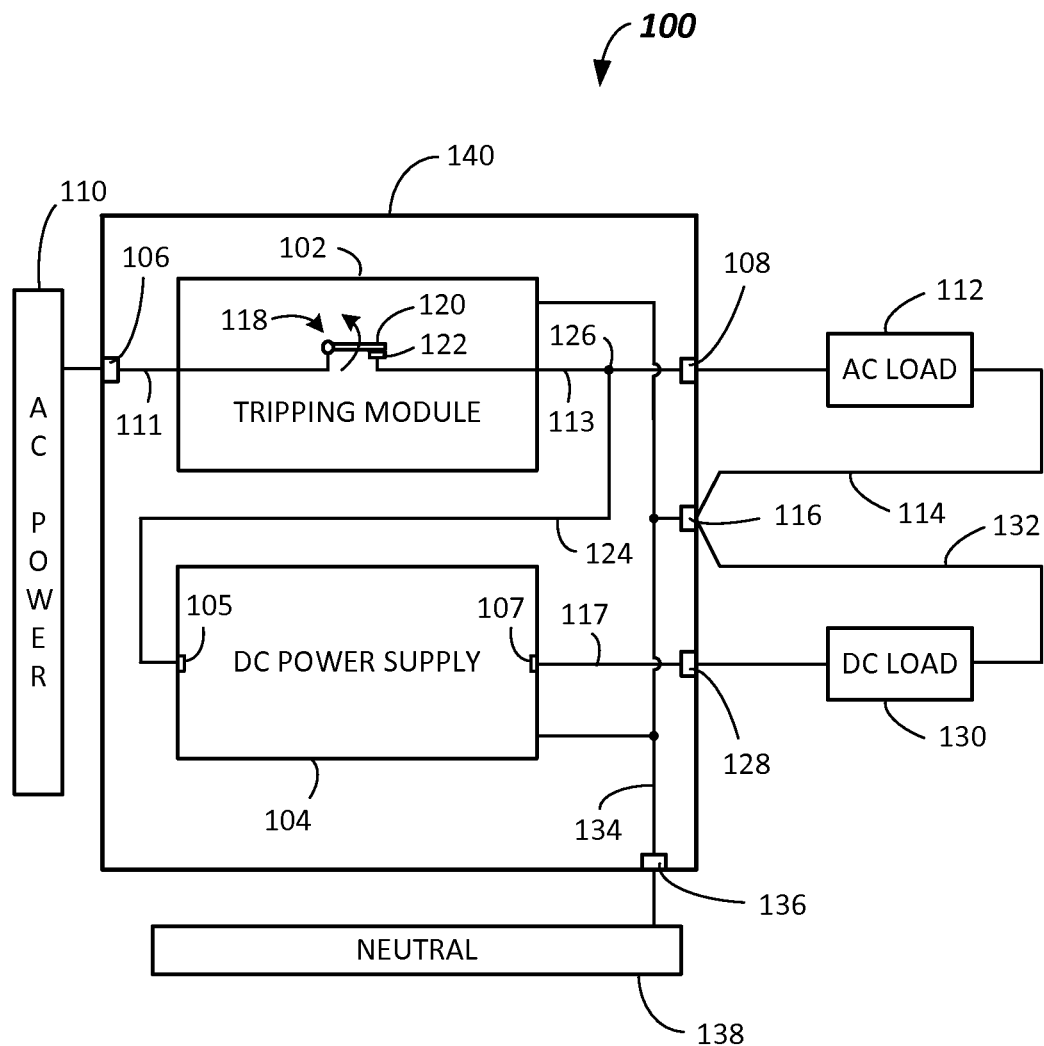
FIG. 1 illustrates a simplified schematic diagram of a circuit breaker that provides AC (alternating current) and DC (direct current) power according to embodiments.

Reference will now be made in detail to the example embodiments of this disclosure, which are illustrated in the accompanying drawings. Wherever possible, the same reference numbers will be used throughout the drawings to refer to the same or like parts.

In one aspect, a circuit breaker may include a DC (direct current) power supply that provides DC power at a DC load connector of the circuit breaker. The DC power may be provided in addition to providing AC power at an AC load connector of the circuit breaker. In some embodiments, the circuit breaker may provide only DC power. The circuit breaker may provide both AC and DC protected power via a tripping module that may include thermo-magnetic components to protect against short circuit and/or overload conditions. In some embodiments, the tripping module may additionally or alternatively include electronic components to protect against arc and/or ground fault conditions.

The circuit breaker may be constructed as a main breaker or a branch circuit breaker. For example, in some embodiments, the circuit breaker may be constructed as a main breaker configured to be coupled to one or more AC feed lines received at a circuit breaker panel. The main breaker may provide both AC and DC power to one or more branch circuit breakers mounted in the circuit breaker panel. In other embodiments, the circuit breaker may be constructed as a branch circuit breaker wherein the housing of the circuit breaker may be sized to occupy only a single branch circuit breaker mounting location in a circuit breaker panel. For example, the housing may be sized to occupy only a single-pole circuit breaker mounting location. The housing may have a transverse width of, e.g., about 1 inch or about 0.75 inch. In some embodiments, the housing may have other dimensions. Also, various embodiments of the circuit breaker may have, e.g., single-pole, 2-pole, duplex, triplex, GFCI (ground fault circuit interrupter), and/or AFCI (arc fault current interrupter) functionality packaged in respective housings sized according to industry standards. Various embodiments of the circuit breaker may provide, e.g., different DC voltage levels and/or different DC maximum output currents.

In another aspect, electrical distribution systems may include one or more circuit breakers that provide DC power that can be distributed from a central location such as, e.g., a circuit breaker panel. DC-powered devices and/or systems coupled to the electrical distribution system may therefore not need their own AC/DC converters. This may reduce the cost of DC-powered devices and systems and may reduce the clutter and wall space required around electrical outlets providing power to those devices and systems. In some embodiments, existing electrical distributions systems may be retrofitted with minimal modification to accommodate circuit breakers providing DC power. Centralized DC power distribution may also improve energy efficiency by reducing the number of AC/DC transformers, which usually result in some energy loss, needed for DC-powered devices and systems. Low energy lighting systems, e.g., such as an LED (light emitting diode) lighting system, may benefit both in terms of energy efficiency and cost by not needing AC/DC transformers.

In other aspects, methods of assembling a circuit breaker are provided, as will be explained in greater detail below in connection with FIGS. 1-8.

FIG. 1 illustrates a circuit breaker 100 that provides both AC and DC protected power in accordance with one or more embodiments. Circuit breaker 100 may be a single-pole circuit breaker that includes a tripping module 102 and a DC power supply circuit 104. Tripping module 102 may be coupled between an AC line connector 106 and an AC load connector 108 via conductors 111 and 113, respectively. AC line connector 106 may be coupled to an AC power bus 110 to receive AC power therefrom. AC power bus 110 may be part of a circuit breaker panel coupled via a main breaker (not shown) to receive AC power from, e.g., a power utility company. In some embodiments, AC line connector 106 may be configured to couple automatically to AC power bus 110 upon mounting of circuit breaker 100 in a circuit breaker mounting location of a circuit breaker panel. Similarly, in some embodiments, AC load connector 108 may be configured to couple automatically to a branch circuit connector (not shown) of a circuit breaker panel upon mounting of circuit breaker 100 in a circuit breaker mounting location of the circuit breaker panel. One or more AC loads 112 (only one is shown) may be coupled in parallel to AC load connector 108 to receive AC power therefrom. A return load circuit conductor 114 may be coupled to a neutral load connector 116 of circuit breaker 100.

Tripping module 102 may, in some embodiments, include a switch 118 and thermo-magnetic sensing components (an embodiment of which is described in detail below in connection with FIG. 3). Switch 118 may have a movable contact 120 and a stationary contact 122 in the current path between AC line connector 106 and AC load connector 108. In response to sensing an electrical condition between AC line connector 106 and AC load connector 108, the thermo-magnetic sensing components may be configured to open switch 118 (i.e., move movable contact 120 away from and break contact with stationary contact 122), thus interrupting power to AC load 112. The electrical condition may be, e.g., a short circuit or current overload condition. In some embodiments, tripping module 102 may additionally or alternatively include electronic circuitry configured to sense and respond to ground fault and/or arc fault conditions (an embodiment of which is described in detail below in connection with FIG. 4).

DC power supply circuit 104 may include an input 105 and an output 107 and, in some embodiments, may be constructed partially or wholly on a printed circuit board contained within circuit breaker 100. Input 105 may be coupled via a conductor 124 to a node 126 between tripping module 102 and AC load connector 108 to receive AC power therefrom. Output 107 may be coupled to a DC load connector 128 via conductor 117. In some embodiments, DC load connector 128 may be configured to couple automatically to a DC branch circuit connector (not shown) of a circuit breaker panel upon mounting of circuit breaker 100 in a circuit breaker mounting location of the circuit breaker panel. One or more DC loads 130 (only one is shown) may be coupled in parallel to DC load connector 128 to receive DC power therefrom. A return load circuit conductor 132 may be coupled to neutral load connector 116. In some embodiments, circuit breaker 100 may alternatively include a separate DC neutral load connector to which DC loads may be coupled. In other embodiments, circuit breaker 100 may not have neutral load connector 116. AC and/or DC loads may alternatively be coupled directly to another suitable return conductor. Without neutral load connector 116, more space may be available in circuit breaker 100 for other functions and/or for reducing the physical size of circuit breaker 100.

Because of the connection at node 126, tripping module 102 may also sense and respond to an electrical condition sensed in the electrical path through DC power supply circuit 104 and DC load 130. Whenever tripping module 102 trips (i.e., switch 118 opens), DC power provided to DC load 130 is also interrupted along with AC power provided to AC load 112.

Circuit breaker 100 may also include a neutral conductor 134 coupled to tripping module 102, neutral load connector 116, DC power supply circuit 104, and a neutral connector 136 of circuit breaker 100. Neutral connector 136 may be coupled to neutral bus 138, which may be part of a circuit breaker panel. Mounting of circuit breaker 100 in a circuit breaker mounting location of a circuit breaker panel may, in some embodiments, couple neutral connector 136 automatically to neutral bus 138.

Each of conductors 111, 113, 117, 124, and 134 may be an electrical wire or cable of suitable gauge and/or size for the AC and/or DC power coupled through circuit breaker 100.

Circuit breaker 100 may also include a housing 140 that contains tripping module 102, DC power supply circuit 104, AC line connector 106, AC load connector 108, and DC load connector 128. In some embodiments, circuit breaker 100 may be configured to occupy only a single branch circuit breaker mounting location in a circuit breaker panel. In various embodiments, depending on the number of protected poles, housing 140 may be sized to occupy a single-pole, two-pole/duplex, or triplex circuit breaker mounting location in a circuit breaker panel. In some embodiments, housing 140 may be sized, shaped, and/or otherwise constructed identically or similarly as standard circuit breaker housings suitably configured for mounting in standard circuit breaker mounting locations of a circuit breaker panel.

Figure 2A:
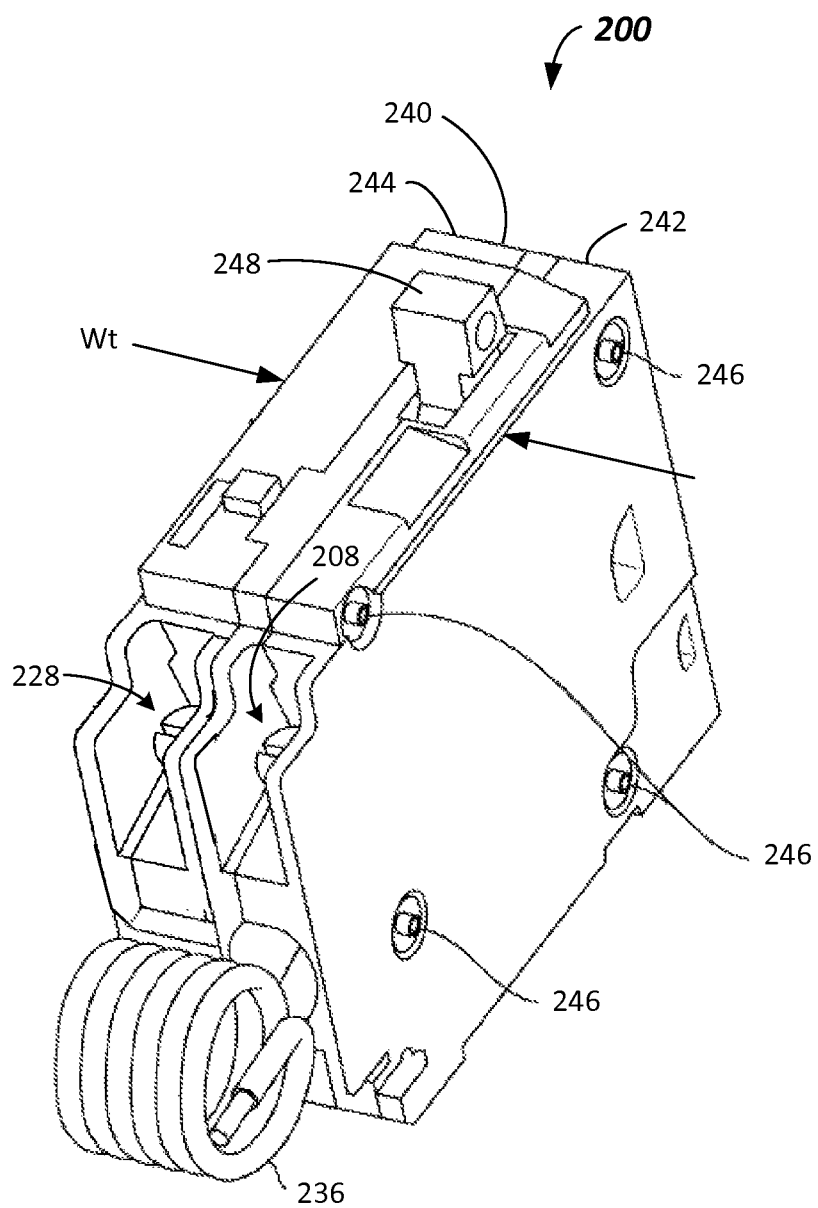
FIG. 2A illustrates a perspective view of a single-pole circuit breaker that provides AC and DC power according to embodiments.
Figure 2B:
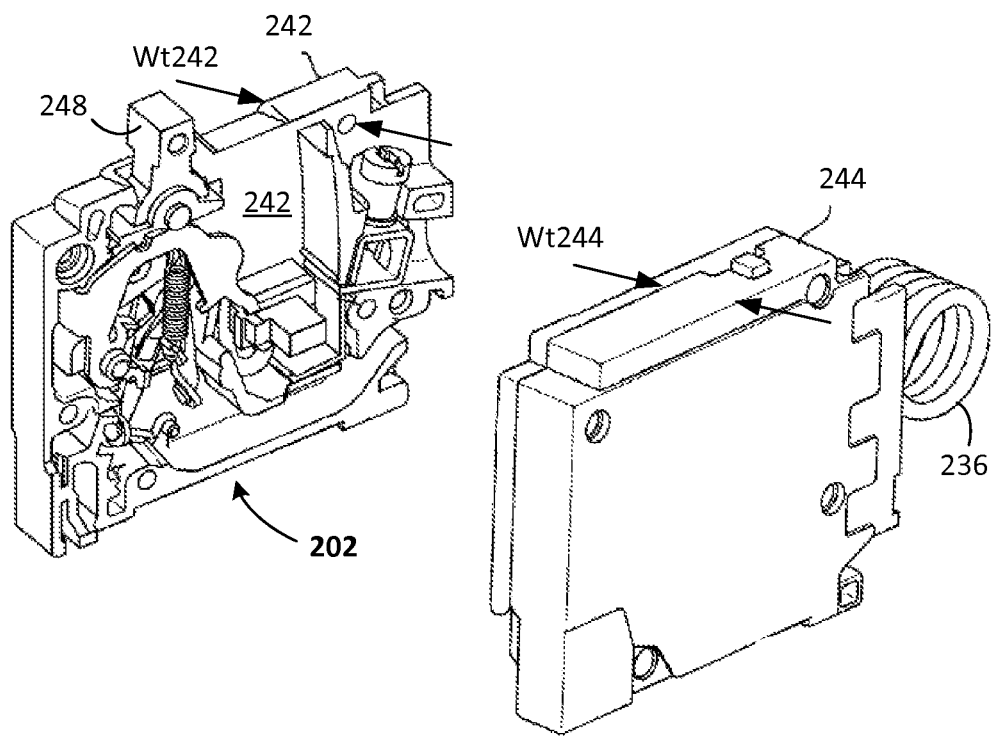
FIG. 2B illustrates a perspective view of the two compartments of the single-pole circuit breaker of FIG. 2A according to embodiments.

FIGS. 2A and 2B illustrate a single-pole circuit breaker 200 that provides both AC and DC protected power packaged in a housing 240 in accordance with one or more embodiments. Housing 240 may include therein a tripping module 202, which may function identically or similarly as tripping module 102, and a DC power supply circuit such as, e.g., DC power supply circuit 104. Housing 240 may also include an AC load connector 208 and a DC load connector 228. In some embodiments, housing 240 may have a transverse width Wt of about 1 inch or about 0.75 inch and may be sized to occupy only one single-pole branch circuit breaker mounting location in a circuit breaker panel. In other embodiments, housing 240 may have other suitable transverse widths.

In some embodiments, housing 240 may have a tripping module compartment 242 and a DC power supply compartment 244. Tripping module compartment 242 may be sized to enclose tripping module 202 therein, and DC power supply compartment 244 may be sized to enclose a DC power supply circuit therein, such as, e.g., DC power supply circuit 104. In some embodiments, tripping module compartment 242 may have a transverse width Wt242 of about 0.5 inches or about 0.375 inches. In some embodiments, DC power supply compartment 244 may have a transverse width Wt244 of about 0.5 inches or about 0.375 inches. Tripping module compartment 242 and DC power supply compartment 244 may be attached to each other using one or more screws or rivets 246 (four are shown). Tripping module compartment 242 and DC power supply compartment 244 may alternatively be attached to each other in any suitable manner. Tripping module compartment 242 and DC power supply compartment 244 may be molded parts made with a thermal setting resin material with electrical insulating properties. In some embodiments, tripping module compartment 242 and DC power supply compartment 244 may be formed from any suitable plastic or dielectric material. Other suitable materials may be also used. A handle 248 may extend outward from tripping module compartment 242 that may be coupled to a suitable mechanism in tripping module 202 for manual tripping and resetting of circuit breaker 200 (e.g., opening and closing of a switch such as, e.g., switch 118 of tripping module 102). In some embodiments, housing 240 may have a neutral connector 236 extending therefrom (which in some embodiments may be referred to as a neutral pigtail).

Figure 3:
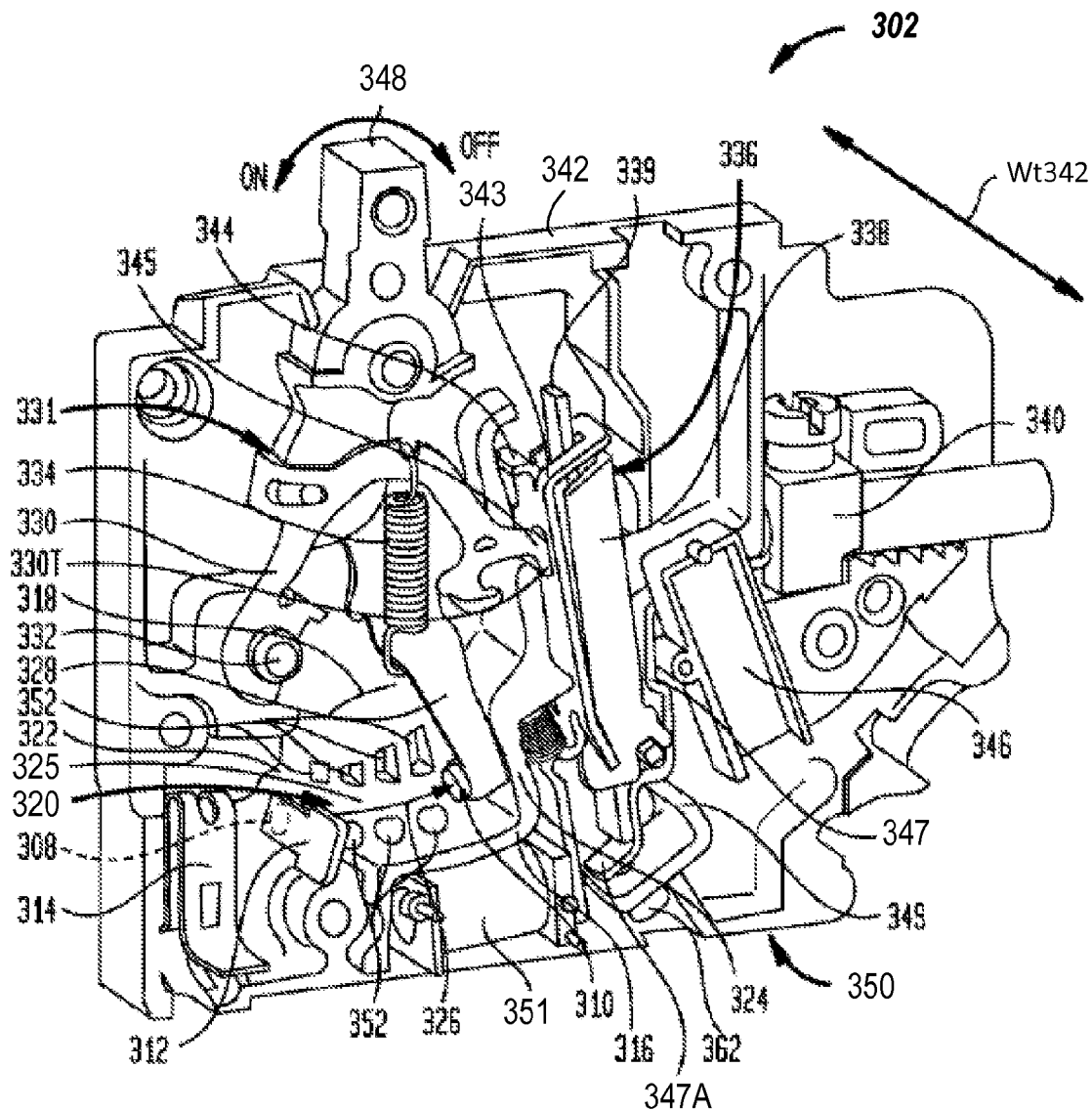
FIG. 3 illustrates a perspective view of a tripping module of a circuit breaker according to embodiments.

FIG. 3 illustrates a tripping module 302 that includes thermo-magnetic sensing components 350 in accordance with one or more embodiments. Tripping module 302 may be included in, e.g., circuit breaker 200 and may function identically or similarly as tripping module 102. Tripping module 302 may be mounted or positioned in a tripping module compartment 342 of a circuit breaker housing. Tripping module 302 may be configured to interface with a DC power supply compartment to form an arc chamber 320. Arc chamber 320 may receive and extinguish an arc that may be created during a tripping event (i.e., the separating of movable and stationary contacts such as, e.g., movable contact 120 and stationary contact 122). Arc chamber 320 may be formed by a first transverse sidewall 325 formed by an inside surface of tripping module compartment 342. An opposing transverse sidewall (not shown) of arc chamber 320 may be formed by an inside surface of a DC power supply compartment that interfaces with tripping module compartment 342. Arc chamber 320 may be further defined by end walls 316 and 318 in a vertical dimension (as shown), and by end walls 322 and 324 in a horizontal dimension (as shown). In some embodiments, arc chamber 320 may include one or more recesses 352 formed (e.g., molded) into first transverse sidewall 325. These recesses 352 may receive a portion of the electrical arc generated by a tripping event and may promote rapid arc extinguishment within the circuit breaker.

Thermo-magnetic sensing components 350 may include a movable electrical contact 310 and a stationary electrical contact 308 (shown in phantom because it is located on the opposite side of a contact terminal 312). Stationary electrical contact 308 and movable electrical contact 310 are positioned, and included, within arc chamber 320. Stationary electrical contact 308 may be secured (e.g., welded) to contact terminal 312, which connects to an AC line connector 314 by a suitable electrical conduit, such as, e.g., an insulated or braided wire. In some embodiments, AC line connector 314 may be received over a stab of an AC power bus in a circuit breaker panel and may provide AC power to a branch electrical circuit. Upon a tripping event, movable electrical contact 310, which may be attached to a contact arm 328, may move along a travel path 326 to a maximum separated position (i.e., a tripped position), as shown in FIG. 3. This movement may cause an electrical arc as the current path between stationary electrical contact 308 and movable electrical contact 310 is broken. The electrical arc may rapidly extinguish in arc chamber 320.

Tripping module 302 may include a handle 348 for manual tripping. Handle 348 may be manually moved from an ON position to an OFF position, which interrupts power by separating movable electrical contact 310 from stationary electrical contact 308. Moving handle 348 may cause a spring 334 (e.g., a coil spring) to exert a force on contact arm 328, which may cause contact arm 328 to pivot relative to a lower portion of handle 348 and to move along travel path 326 to the maximum separated position (i.e., the tripped position), as shown.

Thermo-magnetic sensing components 350 may also include a tripping unit 336 of a tripping mechanism 331 that may trip in response to sensing a persistent current overload condition. A persistent current overload condition may cause a portion of tripping unit 336 to exceed a predetermined temperature threshold. Tripping unit 336 may include a magnet 338, a bimetal member 339 received alongside magnet 338, and an armature 343. Bimetal member 339 may be displaceable (e.g., bendable) towards magnet 338 in response to increased resistive heating (and a resultant temperature increase) of bimetal member 339, which may be caused by a persistent current overload condition. Additionally, if a short circuit condition occurs, the high current through bimetal member 339 may cause magnet 338 to attract armature 343, thereby causing a trip. In the persistent current overload condition, bimetal member 339 may contact armature 343, thereby disengaging a latching surface 344 of armature 343 from a triggering surface 330T of a cradle 330. In a short circuit condition, magnetic attraction of armature 343 to magnet 338 may cause latching surface 344 of armature 343 to disengage from triggering surface 330T of cradle 330. In each fault condition, a tripping event may occur that may cause cradle 330 to rotate clockwise about a cradle pivot 332 and cause separation of movable and stationary electrical contacts 310 and 308 by way of a spring 334 exerting a force to cause a counterclockwise rotation of contact arm 328. Upon tripping, the rotational excursion of cradle 330 may be limited by resting on a stop 345 formed on armature 343 or alternatively on a surface of tripping module compartment 342.

In other embodiments, any suitable thermal-magnetic sensing components may be used in tripping module 302. In some embodiments, tripping module 302 may be configured to be packaged in a tripping module compartment 342 having a transverse width Wt342 of about 0.5 inches.

Figure 4:
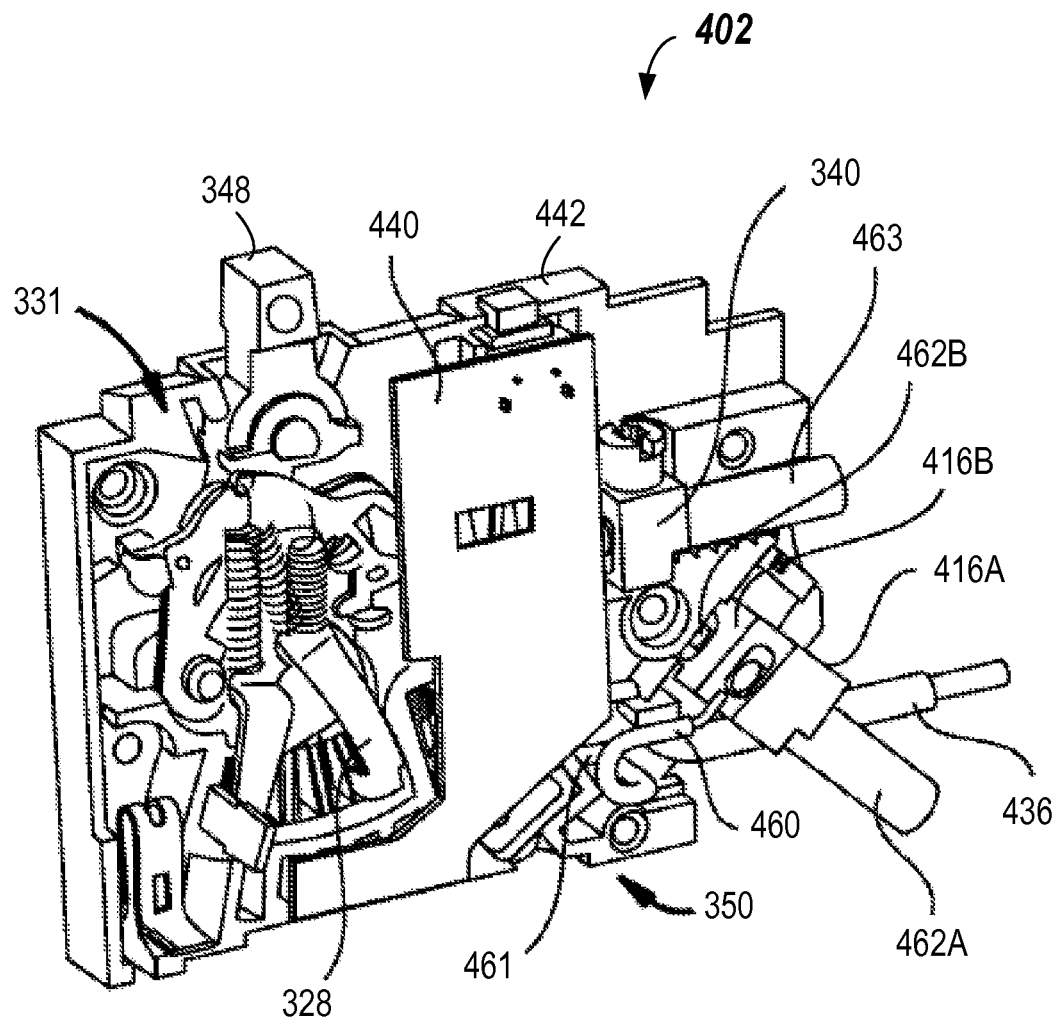
FIG. 4 illustrates a perspective view of another tripping module of a circuit breaker according to embodiments.

FIG. 4 illustrates a tripping module 402 in accordance with one or more embodiments. Tripping module 402 may be included in, e.g., circuit breaker 200 and may function identically or similarly as tripping module 102. Tripping module 402 may include thermo-magnetic sensing components 350 (of FIG. 3) and an electronic processing circuit 440 and associated components described herein. Electronic processing circuit 440 and the associated components may sense and respond to electrical conditions such as, e.g., ground and/or arc fault conditions. Electronic processing circuit 440 may, in some embodiments, be installed to contact and abut a tripping module compartment 442 of a circuit breaker housing. Electronic processing circuit 440 may be, e.g., in the form of a printed circuit board. In some embodiments, electronic processing circuit 440 may be mounted in a pocket of tripping module compartment 442 and/or may be sandwiched between tripping module compartment 442 and a DC power supply compartment (not shown), such as, e.g., DC power supply compartment 244.

In some embodiments, one or more neutral load connectors 416A and 416B may be provided, at least one of which may be partially retained and received in a pocket of tripping module compartment 442. In some embodiments, neutral load connectors 416A and 416B may be interconnected to electronic processing circuit 440 via electrical wires 460 and 461 and may be provided as an electrical subassembly with electronic processing circuit 440. Further, a neutral line pigtail 436 may interconnect with electronic processing circuit 440 and extend out of a bottom of tripping module compartment 442. Electrical conduits 462A, 462B, and 463 are shown connected to neutral load connectors 416A and 416B and AC load connector 340. Conduits 462A, 462B, and 463 do not form a part of the circuit breaker in some embodiments, but may be part of a protected electrical circuit and are included to illustrate connections to the protected electrical circuit. Conduits 462A, 462B, and 463 may be any suitable gauge required for the electrical circuit, such as, e.g., AWG 8, AWG 10, AWG 12 or AWG 14. Also note that tripping mechanism 331 is shown in FIG. 4 in multiple positions to illustrate the motion of contact arm 328.

Tripping of tripping module 402 may occur upon electronic processing circuit 440 sensing an unwanted electrical condition in an AC and/or DC electrical load circuit coupled thereto (such as, e.g., the load circuits of AC load 112 and DC load 130 of FIG. 1). This may be determined upon processing a signal provided from a sensor 346 (see FIG. 3) coupled to electronic processing circuit 440. Sensor 346 may be any suitable sensor for determining an electrical condition within a load circuit coupled thereto. For example, sensor 346 may be a coil type sensor. Sensor 346 may be provided adjacent to an electrical strap 347 extending between, and electrically connecting, load terminal 340 to a first end of bimetal member 339. Electrical strap 347 may be a metal strap, which may be bent at various locations along its length. Electrical strap 347 may have a cross-sectional area that is rectangular, for example. Other suitable shapes may be provided. An end of bimetal member 339 may be secured to electrical strap 347, such as by welding, for example. Electrical strap 347 may also be welded to load terminal 340. In some embodiments, electrical strap 347 may extend past bimetal member 339 and may include a cantilevered portion 347A. A calibration screw 362 may contact cantilevered portion 347A to adjust a position of bimetal member 339 relative to armature 343, thereby calibrating tripping unit 336. As also shown in FIG. 3, a pivot element 349 may support magnet 338 and allow limited pivoting thereof. The limits of the pivoting may be set by stops formed in tripping module compartment 442, for example. The pivot element 349 may be a separate component or part of tripping module compartment 442. A calibration screw 362 may also be mounted in a base of the pivot element 349.

Upon determining that an unwanted condition exists in a protected AC or DC load circuit (e.g., an arc fault, a ground fault, etc.), electronic processing circuit 440 may cause an actuator 351 to move armature 343. For example, armature 343 may be moved at a first end thereof, and cause a disengagement of latching surface 344 from triggering surface 330T of cradle 330. This, as previously described, separates electrical contacts 308 and 310 from one another and interrupts power to the protected AC and DC electrical load circuits. Actuator 351 may be an electromagnet, which may include a magnetic pole that, upon energizing, magnetically attracts and moves armature 343. In some embodiments, armature 343 may be made from a ferromagnetic material, such as steel. Other suitable magnetically permeable materials may be used instead. In optional embodiments, actuator 351 may be a solenoid or other type of actuator that may be configured to move armature 343 upon command from electronic processing circuit 440. In some embodiments, actuator 351 may be located in a pocket formed adjacent to wall 316. In operation, engaging armature 343 at the first end enables actuator 351 to be located along a back side of tripping module compartment 442 opposite from the handle 348 side, and within the space formed by an interfacing of tripping module compartment 442 and a DC power supply compartment, such as, e.g., DC power supply compartment 244. This may enable components of triggering mechanism 331 (e.g., cradle 330) to be made relatively small, which may free up space located centrally within a circuit breaker having tripping module 402 to compactly house electronic processing circuit 440 and other functional, tripping, and/or DC power supply components.

Figure 5:
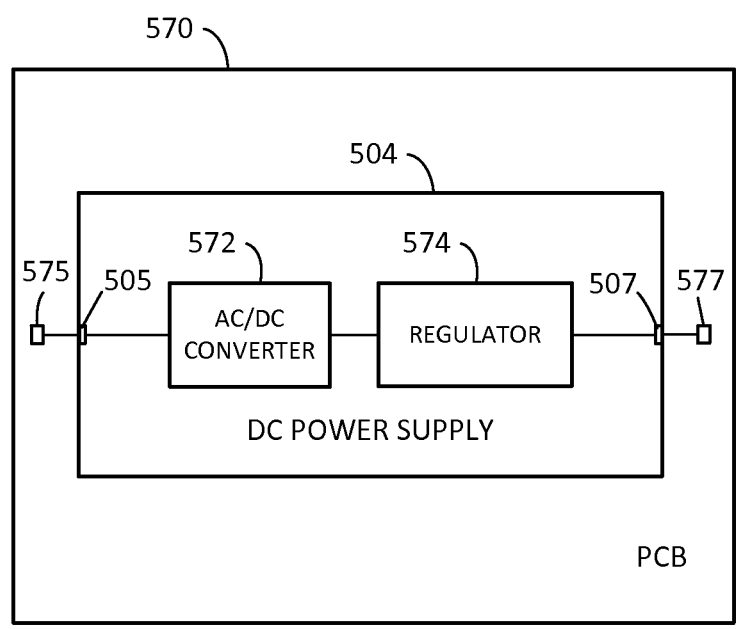
FIG. 5 illustrates a simplified schematic diagram of a DC power supply circuit of a circuit breaker according to embodiments.

FIG. 5 illustrates a DC power supply circuit 504 configured to be contained within a circuit breaker that provides DC protected power in accordance with one or more embodiments. In some embodiments, DC power supply circuit 504 may be constructed wholly or partially on a PCB (printed circuit board) 570 configured to be contained within a circuit breaker and, more particularly, within a DC power supply compartment of a circuit breaker housing, such as, e.g., DC power supply compartment 244 of housing 240 (see FIG. 2A). In some embodiments, PCB 570 may have other circuit components mounted thereon. For example, in some embodiments, an electronic processing circuit or portions thereof configured to sense and respond to arc and/or ground fault conditions, such as electronic processing circuit 440, may be mounted on PCB 570 along with DC power supply circuit 504.

In some embodiments, DC power supply circuit 504 may include an input 505 and an output 507. Input 505 may be configured to receive AC power via a PCB connection terminal 575. PCB connection terminal 575 may be configured to be coupled to an output of a tripping module, such as, e.g., tripping module 102, 202, 302, or 402. Output 507 may be configured to provide DC power via a PCB connection terminal 577. PCB connection terminal 577 may be configured to be coupled to a DC load connector, such as, e.g., DC load connector 128 (of FIG. 1) or 228 (of FIG. 2A).

In some embodiments, DC power supply circuit 504 may include an AC/DC converter 572 and a voltage regulator 574. AC/DC converter 572 may be configured to convert a received AC input current to an output current (whose waveform may have small variations or ripples) that sufficiently approximates a DC output current. In some embodiments, AC/DC converter 572 may include, e.g., a full-wave rectifier, which may be constructed with diodes, as is known in the art. In other embodiments, AC/DC converter 572 may be constructed with any suitable circuitry configured to be contained within a DC power supply compartment of a circuit breaker housing, such as, e.g., DC power supply compartment 244 of housing 204.

Voltage regulator 574 may be a linear voltage regulator configured to provide a stable DC output voltage. In some embodiments, voltage regulator 574 may be a fixed regulator, which is set to provide a specific DC output voltage. In other embodiments, voltage regulator 574 may be a variable regulator, which can be set to provide a DC output voltage within a range of DC output voltages. In some variable voltage regulators, the output voltage may be set by adjusting a variable resistor in a voltage divider of the regulator, as is known in the art. The variable resistor may be accessible to a user in some embodiments and factory preset in other embodiments. DC power supply circuits 504 with variable regulators, which may be referred to as switching power supplies, may accordingly be constructed with the same parts to provide different DC output voltages. In some embodiments, the DC output voltage provided by DC power supply circuit 504 may range from about 12 volts DC to about 48 volts DC. In other embodiments, other DC output voltages may be provided. Voltage regulator 574 may be constructed with any suitable circuitry configured to be contained within a DC power supply compartment of a circuit breaker housing, such as, e.g., DC power supply compartment 244 of housing 204. In some embodiments, AC/DC converter 572 and/or voltage regulator 574 may be off-the-shelf integrated circuits or parts. For example, in some embodiments, TMLM Series AC/DC power modules by Traco Electronic AG, of Zurich, Switzerland may be used. In some embodiments, model GBJ10005-GBJ1010 bridge rectifiers by Diodes Incorporated, of Dallas, Tex. may be used.

Figure 6A:
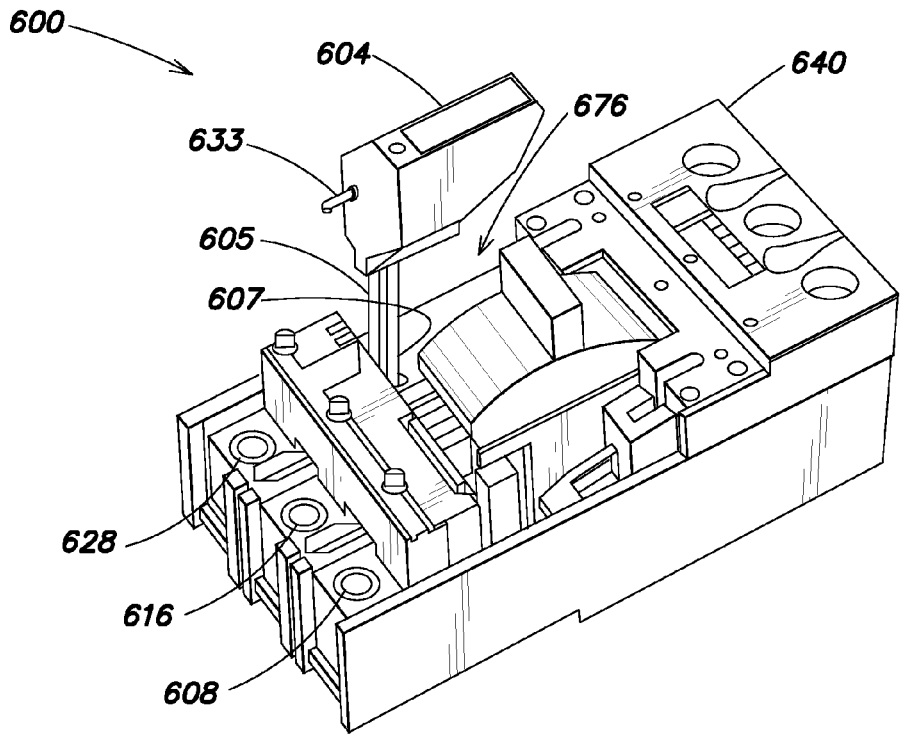
FIGS. 6A and 6B illustrate perspective views of a circuit breaker that provides AC and DC power with a plug-in DC power supply module according to embodiments.
Figure 6B:
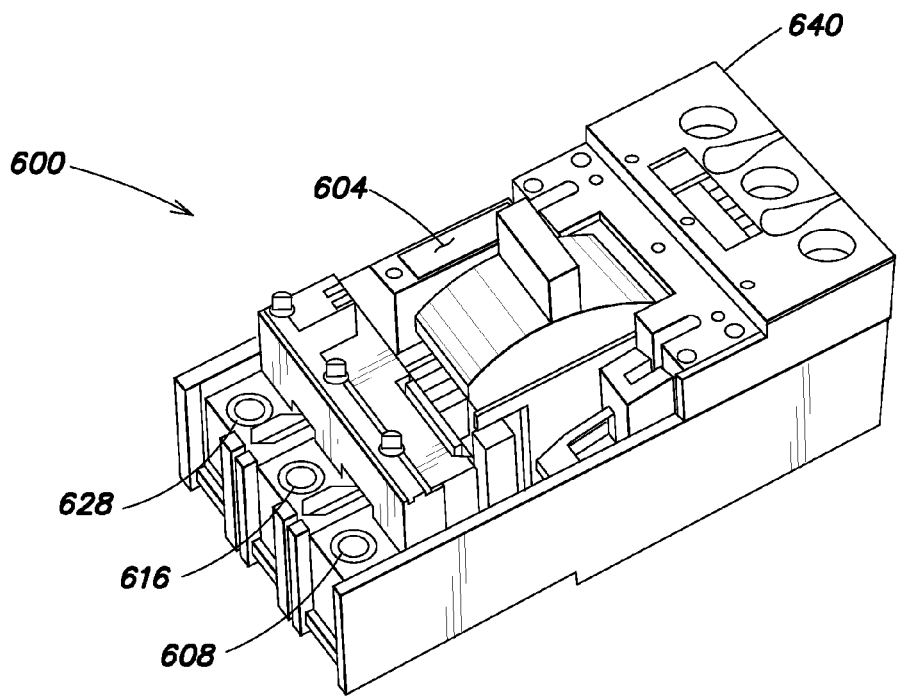

FIGS. 6A and 6B illustrate a circuit breaker 600 that provides AC and optional DC power and has a plug-in DC power supply module 604 in accordance with one or more embodiments. Circuit breaker 600 may include a DC load connector 628, a neutral load connector 616, and an AC load connector 608. As shown in FIG. 6A, circuit breaker 600 may have a housing 640 with a surface recess 676 configured to receive DC power supply module 604. Plug-in DC power supply module 604 may provide DC power and have an input connector 605 and an output connector 607. Input connector 605 and output connector 607 may each be configured to plug into a respective connector receptacle (not shown) configured in recess 676 of circuit breaker 600. Any suitable type of connectors and corresponding connector receptacles may be used. Upon insertion of DC power supply module 604 into recess 676 as shown in FIG. 6B, input connector 605 may be coupled to receive AC power via one or more suitable conductors coupled to an output of a tripping module contained in housing 640 (such as, e.g., conductor 124 coupled to an output of tripping module 102 of circuit breaker 100). DC output connector 607 may be coupled to provide DC power to DC load connector 628 via one or more suitable conductors in housing 640 (such as, e.g., conductor 117 of circuit breaker 100). DC power provided by circuit breaker 600 at DC load connector 628 via DC power supply module 604 may thus be protected by the tripping module of circuit breaker 600. Plug-in DC power supply module 604 may also have a neutral connector 633 configured to be coupled to a neutral conductor (not shown) of circuit breaker 600 (such as, e.g., neutral conductor 134 of circuit breaker 100). DC power supply module 604 may be plugged-in to circuit breaker 600 in any suitable manner including, e.g., a friction fit or a snap-in connection feature of connectors 605 and 607. DC power supply module 604 may include and/or function identically or similarly as DC power supply circuit 104 and/or DC power supply circuit 504. Without DC power supply module 604, circuit breaker 600 may function as a conventional single-pole circuit breaker and provide protected AC power.

Figure 7:
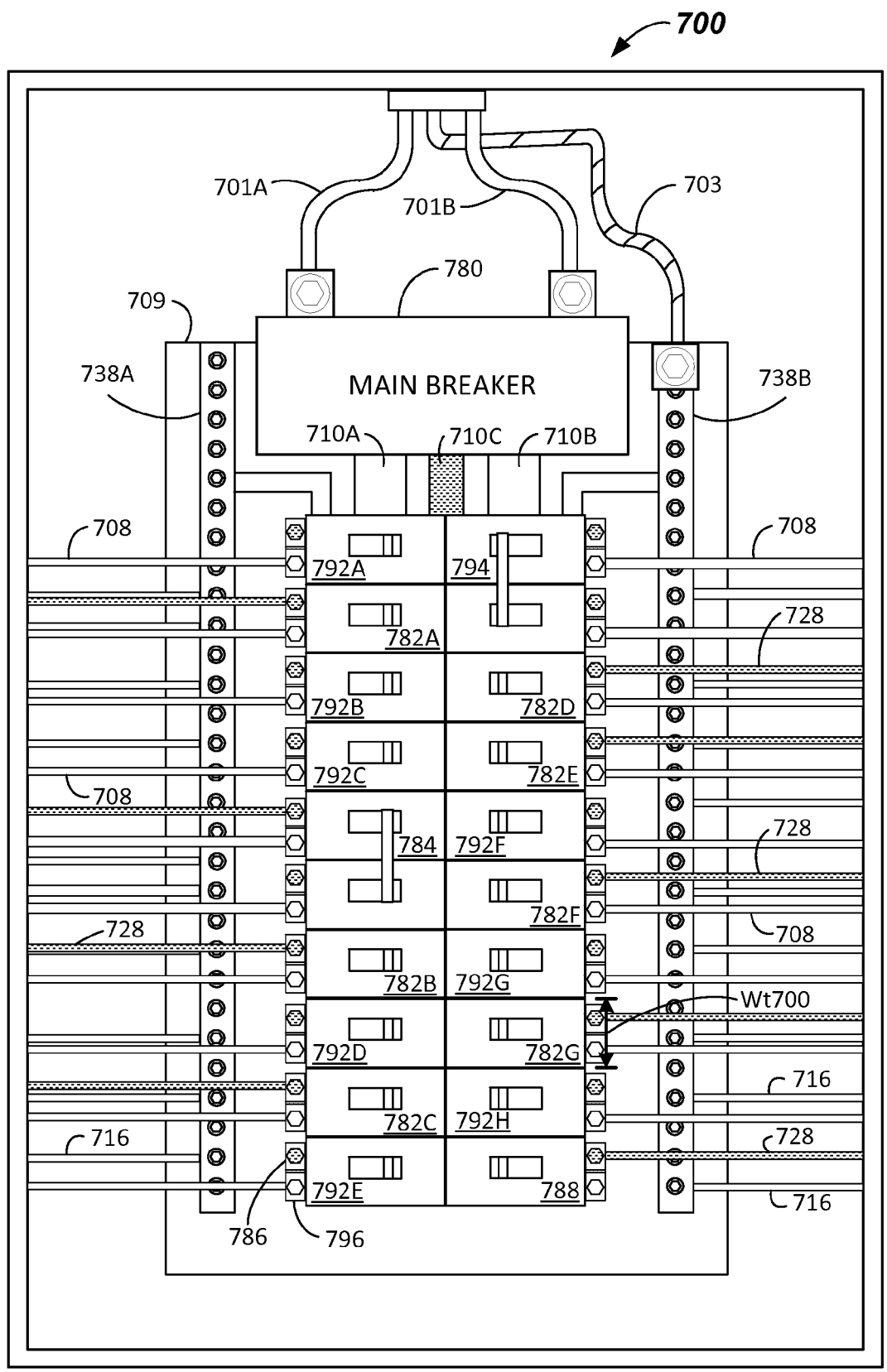
FIG. 7 illustrates a schematic diagram of a circuit breaker panel that distributes both AC and DC power according to embodiments.

FIG. 7 illustrates a circuit breaker panel 700 for distributing both AC and/or DC power to one or more branch circuits connected to circuit breaker panel 700 in accordance with one or more embodiments. Circuit breaker panel 700 may include a circuit breaker panelboard 709 that includes a plurality of circuit breaker mounting locations. The plurality of circuit breaker mounting locations may include a main breaker mounting location, shown occupied by a main breaker 780, and a plurality of branch circuit breaker mounting locations, shown occupied by branch circuit breakers 782A-782G, 784, 788, 792A-792G, and 794. In some embodiments, each branch circuit breaker mounting location may be configured to receive a circuit breaker having a transverse width Wt700 of about 1 inch or about 0.75 inch. In other embodiments, one or more circuit breaker mounting locations may be configured to receive a circuit breaker having other suitable transverse widths. Although 20 branch circuit breaker mounting positions are shown in circuit breaker panel board 709, other embodiments may have other numbers of circuit breaker mounting locations. Branch circuit breakers 782A-7826, 788, and 792A-792G may be single-pole circuit breakers, while branch circuit breakers 784 and 794 may be two-pole circuit breakers. In other embodiments, circuit breaker panelboard 709 may have other combinations of single-pole and two-pole circuit breakers and may have other types of suitable circuit breakers (e.g., duplex, triplex, etc.) as well.

Circuit breaker panelboard 709 may include a plurality of DC branch circuit connectors 786 (of which only one is labeled in FIG. 7) each configured to be coupled to respective DC branch circuit wiring 728 (of which only four are labeled in FIG. 7). Circuit breaker panelboard 709 may also include a plurality of AC branch circuit connectors 796 (of which only one is labeled in FIG. 7) each configured to be coupled to respective AC branch circuit wiring 708 (of which only four are labeled in FIG. 7). In some embodiments, AC and/or DC load connectors of a branch circuit breaker may automatically be coupled a respective AC and/or DC branch circuit connector upon mounting of the branch circuit breaker in a branch circuit mounting location. (In FIG. 7, each DC branch circuit connector 786 and each DC branch circuit wiring 728 is illustrated with a dot fill pattern.)

Circuit breaker panel 700 may receive AC feeder lines 701A and 701B, each of which may provide AC power of a different phase (e.g., Phase A and Phase B as commonly received in residences). AC feeder lines 701A and 701B may be coupled to main breaker 780. In some embodiments, only a single AC feeder line may be received, while in other embodiments, more than two AC feed lines may be received. Circuit breaker panel 700 may also receive a ground feeder line 703 coupled at circuit breaker panelboard 709 to one or more neutral buses 738A and 738B. Neutral buses 738A and 738B may be coupled to each other via a conductor (not shown) that may run behind circuit breaker panelboard 709.

In some embodiments, main breaker 780 may provide both AC and DC power. Main breaker 780 may function and be configured identically or similarly as circuit breakers 100, 200, and/or 600, wherein main breaker 780 may include at least one tripping module, such as tripping module 102, and at least one DC power supply, such as DC power supply circuit 104. Main breaker 780 may distribute AC power to the branch circuit breakers via AC power buses 710A and 710B, each AC power bus carrying AC power of a different phase. In some embodiments, AC power bus 710A may provide AC power to the branch circuit breakers mounted in a first (e.g., left-side) column on circuit breaker panelboard 709, and AC power bus 710B may provide AC power to the branch circuit breakers mounted in a second (e.g., right-side) column on circuit breaker panelboard 709. In some embodiments, main breaker 780 may couple received AC power to a single AC power bus. Main breaker 780 may also distribute DC power to some or all of the branch circuit breakers via a DC power bus 710C (illustrated with a dot fill pattern). In some embodiments, main breaker may distribute DC power via two parallel DC power buses, wherein each DC power bus couples DC power to, e.g., a respective column of branch circuit breakers. In some embodiments, one or more branch circuit breakers may receive DC power via a DC line connector analogous to AC line connector 106. The received DC power may be coupled to a tripping module and then to a DC load connector, such as, e.g., DC load connector 128. In some embodiments, the DC power may additionally be coupled to a voltage regulator or like circuitry within the circuit breaker to output a different DC voltage level than that received.

In some embodiments, main breaker 780 may be a conventional main breaker that couples only AC power to the branch circuit breakers, in which case DC power bus 710C may be omitted. As shown in FIG. 7, single-pole branch circuit breakers 782A-782G and two-pole circuit breaker 784 may provide both AC and DC power and may each include at least one tripping module, such as tripping module 102, and at least one DC power supply, such as DC power supply circuit 104. Single-pole branch circuit breakers 782A-782G may function and/or be configured identically or similarly as circuit breakers 100, 200, and/or 600. AC power may be distributed to branch circuits via AC branch circuit wiring 708, while DC power may be distributed to branch circuits via DC branch circuit wiring 728. Single-pole branch circuit breaker 788 may provide only DC power. In some embodiments, single-pole branch circuit breaker 788 may not have an AC load connector wherein its tripping module may be coupled directly to its DC power supply. For example, referring to FIG. 1, circuit breaker 788 may have a tripping module 102 coupled directly to a DC power supply circuit 104 wherein there is no circuit connection between node 126 and AC load connector 108 and, in some embodiments, no AC load connector 108. Single-pole branch circuit breakers 792A-792G and two-pole branch circuit breaker 794 may be conventional circuit breakers providing only AC power via AC branch circuit wiring 708. In other embodiments, more or less branch circuit breakers than those shown may provide both AC and DC power and/or only DC power. AC and DC branch circuit returns may be made by return wiring 716 (of which three are labeled in FIG. 7) coupled to neutral bus 738A or 738B.

In some embodiments, main breaker 780 may distribute both AC and DC power and at least some of the branch circuit breakers, such as, e.g., branch circuit breakers 782A-782G and 784 may also provide both AC and DC power. In these embodiments, one or more of the branch circuit breakers may couple the DC power received from main breaker 780 directly to a DC branch circuit connector 786, or may receive DC power from main breaker 780 and couple a different DC output voltage to a DC branch circuit connector 786, or may convert AC power received from main breaker 780 to DC power that is then coupled to a DC branch circuit connector 786.

Figure 8:
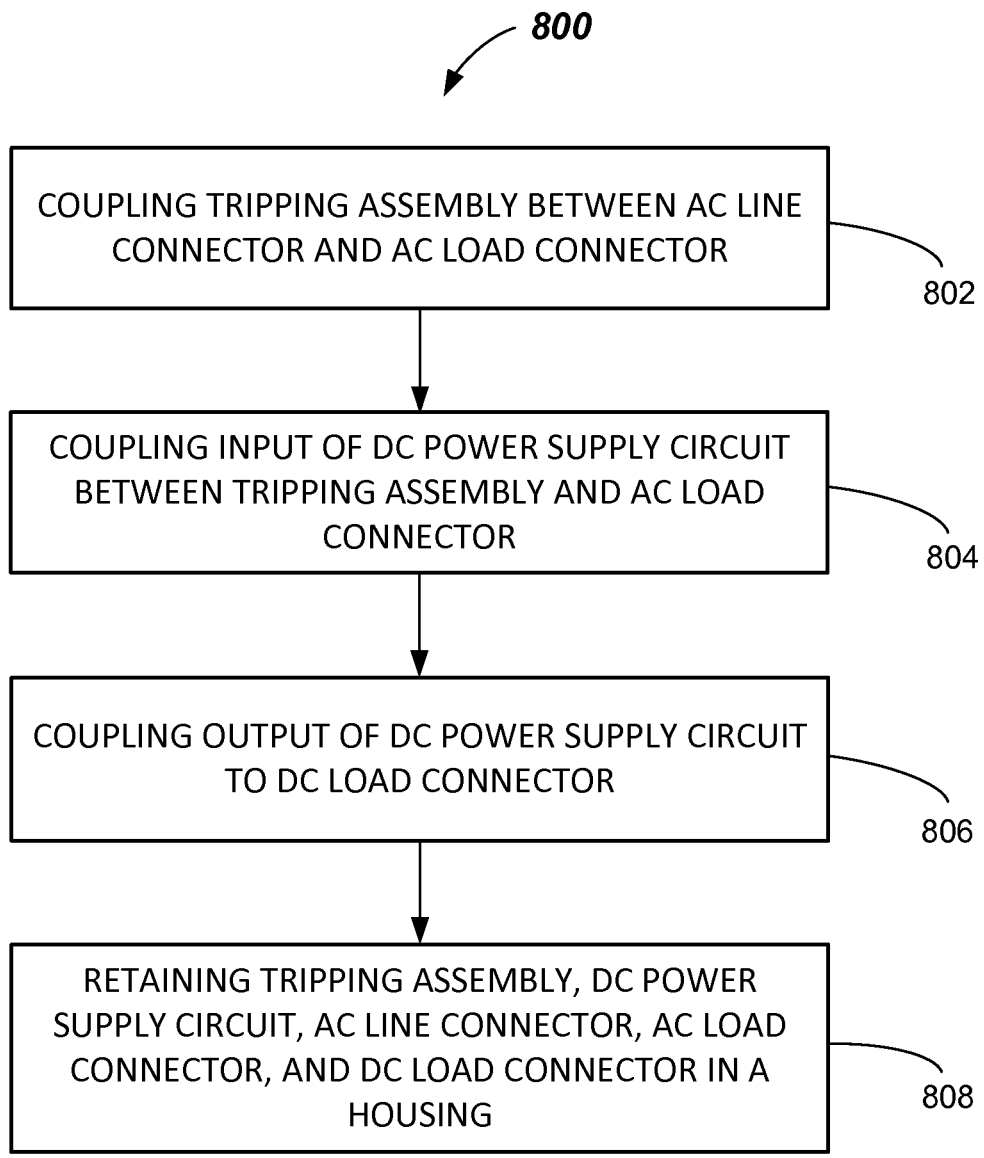
FIG. 8 illustrates a flowchart of a method of assembling a circuit breaker according to embodiments.

FIG. 8 illustrates a method 800 of assembling a circuit breaker in accordance with one or more embodiments. At process block 802, method 800 may include coupling a tripping module between an AC line connector and an AC load connector. For example, the tripping module may be tripping module 102 of FIG. 1, wherein an input of tripping module 102 may be coupled to AC line connector 106 of circuit breaker 100 and an output of tripping module 102 may be coupled to AC load connector 108 of circuit breaker 100.

At process block 804, method 800 may include coupling an input of a DC power supply circuit to a node between the tripping module and the AC load connector. Again referring to FIG. 1, e.g., the DC power supply circuit may be DC power supply circuit 104, wherein input 105 of DC supply circuit 104 may be coupled to node 126 via conductor 124. As shown, node 126 is in an electrical path between tripping module 102 and AC load connector 108.

At process block 806, coupling an output of the DC power supply circuit to a DC load connector may be performed. Continuing with the above example, output 107 of DC power supply circuit 104 may be coupled to DC load connector 128 of circuit breaker 100, as shown in FIG. 1.

At process block 808, method 800 may include retaining the tripping module, DC power supply circuit, AC line connector, AC load connector, and DC load connector in a housing. For example, again referring to FIG. 1, tripping module 102, DC power supply circuit 104, AC line connector 106, AC load connector 108, and DC load connector 128 may, in some embodiments, be retained (i.e., held secure and/or intact) in housing 140.

The above process blocks of method 800 may be executed or performed in an order or sequence not limited to the order and sequence shown and described. For example, in some embodiments, process block 806 may be performed after or in parallel with process block 804.

Persons skilled in the art should readily appreciate that the invention described herein is susceptible of broad utility and application. Many embodiments and adaptations of the invention other than those described herein, as well as many variations, modifications, and equivalent arrangements, will be apparent from, or reasonably suggested by, the invention and the foregoing description thereof, without departing from the substance or scope of the invention. For example, although described in connection with circuit breakers, one or more embodiments of the invention may be used with other types of circuit protection devices and/or equipment that receive AC power but require conversion from AC power to DC power. Accordingly, while the invention has been described herein in detail in relation to specific embodiments, it should be understood that this disclosure is only illustrative and presents examples of the invention and is made merely for purposes of providing a full and enabling disclosure of the invention. This disclosure is not intended to limit the invention to the particular apparatus, devices, assemblies, systems or methods disclosed, but, to the contrary, the intention is to cover all modifications, equivalents, and alternatives falling within the scope of the invention.

What is claimed is:

1. A circuit breaker, comprising:
   an AC line connector;
   an AC load connector;
   a tripping module coupled between the AC line connector and the AC load connector, the tripping module configured to interrupt power between the AC line connector and the AC load connector in response to sensing an electrical condition between the AC line connector and the AC load connector;
   a DC power supply circuit having an input and an output, the input coupled between the tripping module and the AC load connector, and the output configured to provide a DC voltage;
   a DC load connector coupled to the output of the DC power supply circuit; and
   a housing containing the AC line connector, the AC load connector, the tripping module, the DC power supply circuit, and the DC load connector.

2. The circuit breaker of claim 1, wherein the circuit breaker is configured as a main breaker of a circuit breaker panel, the AC line connector is configured to be coupled to an AC feeder line supplying AC power, and the AC load connector is configured to be coupled to at least one AC power bus of the circuit breaker panel.

3. The circuit breaker of claim 1, wherein the circuit breaker is configured as a branch circuit breaker of a circuit breaker panel, the AC line connector is configured to be coupled to an AC power bus of the circuit breaker panel, and the AC load connector is configured to be coupled to an AC branch circuit connector of the circuit breaker panel.

4. The circuit breaker of claim 1 wherein the housing is configured to occupy only a single branch circuit breaker mounting location in a circuit breaker panel.

5. The circuit breaker of claim 1 wherein the housing has a transverse width of about 1 inch or about 0.75 inch.

6. The circuit breaker of claim 1, wherein the tripping module includes a switch and thermo-magnetic sensing components, the switch coupled between the AC line connector and the AC load connector, and the thermo-magnetic sensing components configured to open the switch in response to sensing the electrical condition between the AC line connector and the AC load connector.

7. The circuit breaker of claim 1, wherein the electrical condition comprises a short circuit, current overload, ground fault, or arc fault condition.

8. The circuit breaker of claim 1, wherein the DC power supply circuit comprises an AC/DC converter and a voltage regulator.

9. The circuit breaker of claim 1 wherein the DC power supply circuit is included in a plug-in module configured to be plugged in to the circuit breaker.

10. A circuit breaker panel system, comprising:
    a circuit breaker panelboard including a plurality of circuit breaker mounting locations; and
    a circuit breaker configured to provide AC power and DC power, the circuit breaker including a tripping module and a DC power supply circuit that provides the DC power, the tripping module configured to sense and respond to an electrical condition, and the circuit breaker configured to occupy a single one of the plurality of circuit breaker mounting locations, wherein:
    the circuit breaker panelboard includes at least one AC power bus and at least one DC power bus;
    one of the plurality of circuit breaker mounting locations is a main breaker mounting location; and
    the circuit breaker is mounted to the main breaker mounting location and is configured to:
    receive AC power from an AC feeder line received at the circuit breaker panelboard,
    couple the AC power from the AC feeder line to the at least one AC power bus, and
    couple the DC power to the at least one DC power bus.

11. The circuit breaker panel system of claim 10, further comprising:
    a plurality of AC branch circuit connectors each configured to be coupled to respective AC branch circuit wiring; wherein:
    a branch circuit breaker is configured to be coupled to one of the plurality of AC branch circuit connectors when mounted in one of the plurality of circuit breaker mounting locations.

12. The circuit breaker panel system of claim 10, further comprising:
    a plurality of DC branch circuit connectors each configured to be coupled to respective DC branch circuit wiring; wherein:
    a branch circuit breaker is configured to be coupled to one of the plurality of DC branch circuit connectors when mounted in one of the plurality of circuit breaker mounting locations.

13. The circuit breaker panel system of claim 10 wherein:
    a subplurality of the plurality of circuit breaker mounting locations is configured to receive a respective subplurality of branch circuit breakers each having a transverse width of about 1 inch or about 0.75 inch.

14. A method of assembling a circuit breaker, comprising:
    coupling a tripping module between an AC line connector and an AC load connector, the tripping module configured to sense and respond to an electrical condition between the AC line connector and the AC load connector;
    coupling an input of a DC power supply circuit between the tripping module and the AC load connector;
    coupling an output of the DC power supply circuit to a DC load connector; and
    retaining the tripping module, the DC power supply circuit, the AC line connector, the AC load connector, and the DC load connector in a housing.

15. The method of claim 14, further comprising sizing the housing to occupy only a single branch circuit breaker mounting location in a circuit breaker panel.

16. The method of claim 14, further comprising sizing the housing to have a transverse width of about 1 inch or about 0.75 inch.

17. The method of claim 14, further comprising:
    configuring the AC line connector to be coupled to an AC power bus of a circuit breaker panel; and
    configuring the AC load connector to be coupled to a branch circuit connector of the circuit breaker panel.

18. The method of claim 14, further comprising configuring the housing to occupy a main breaker mounting location in a circuit breaker panel.

19. The method of claim 14, further comprising:
    configuring the AC line connector to be coupled to an AC feeder line received at a circuit breaker panel; and configuring the AC load connector to be coupled to an AC power bus of the circuit breaker panel.

* * * * *